UNITED STATES PATENT OFFICE.

CARL BENNERT, OF COEPENICK, NEAR BERLIN, GERMANY, ASSIGNOR, BY MESNE ASSIGNMENTS, TO THE CHEMICAL FOUNDATION, INC., A CORPORATION OF DELAWARE.

TREATMENT OF TEXTILE FIBERS AND FABRICS.

1,379,381.     Specification of Letters Patent.     Patented May 24, 1921.

No Drawing.     Application filed October 19, 1916. Serial No. 126,533.

*To all whom it may concern:*

Be it known that I, CARL BENNERT, a subject of the Emperor of Germany, and residing at Coepenick, near Berlin, Germany, have invented certain new and useful Improvements in the Treatment of Textile Fibers and Fabrics, of which the following is a specification.

In my pending application, Ser. No. 68,847, filed December 27, 1915, I claimed the application of the products of albumin obtained by partial decomposition as a means for cleansing goods of all kinds. The compounds produced act as a substitute for soap and the like. I have now found that those products can also be used with great advantage either by themselves or in combination with other substances for cleansing the raw textile fibers and the products of textile industry generally. Especially is such the case with woolen fiber during the different steps in the manufacture for the preparation of woolen goods.

For the utilization of the valuable cleansing properties of these substances, the efficient constituent parts of which appear to be the protalbinic and lysalbinic acids and their salts, it is not necessary to separate these products of decomposition of albuminoid matter or to purify them in any way, although it is advantageous to neutralize the alkali in excess in the raw solution by a suitable acid until it is neutral with respect to phenolphthalein.

The raw solution can be applied for general cleansing purposes without any purification. For use in the textile trade it is preferable to purify the solution by removing the compounds, produced by secondary reactions, which form insoluble salts of calcium or magnesium. This is effected by adding from 2 to 10% of dry calcium or magnesium hydroxid either in the cold or by heating, whereby frequently other impurities also are removed, so that such a treatment may be considered advisable for many reasons.

The protalbinic and lysalbinic acids, as produced by Paal, are the typical compounds of this invention, although it is generally preferable to use the analogous acids of this series, which, instead of being prepared from albumin, are prepared from glue, casein, vegetable gluten, wool and so on.

In all these cases, they are prepared by treatment with dilute caustic alkali or other soluble caustic-acting compounds, the acids and salts obtained corresponding to the protalbinic and lysalbinic acids resulting from albumin. There appear to be slight differences in their general properties, some being more or less soluble in water or more or less hygroscopic and so forth, but for the application of the present invention, they are all alike useful.

The following examples will illustrate the preparation and the application of some products of the invention.

*Preparation of the wheat-gluten product.*

100 parts of finely powdered pure wheat-gluten (calculated as free from water and ash) are mixed with 18 parts of caustic soda and 500 parts of water. The formation of lumps should be avoided. The mass is briskly agitated and heated on the water bath, the evaporated water being replaced from time to time. The heating is continued until only a small amount of flocculent material remains in the solution, which usually requires about ⅔ hour. The heating is then discontinued and while the mass is further agitated from 2 to 3 parts of calcium hydroxid, in small portions, are added to the hot solution. The mass is stirred until the solution is cold and for half an hour after it has thoroughly cooled down, whereupon the solution is filtered. When treating vegetable albumin it is better to use 18 parts of caustic soda instead of 15 parts as suggested by Paal, in order to bring all the gluten used into reaction. The solution is carefully neutralized by means of dilute formic acid and evaporated to dryness in a vacuum apparatus.

*Preparation of the glue product (gluten or collagen).*

100 parts of glue made from leather or bones (free from water and ash) are allowed to melt in a solution of 15 parts of caustic soda and 500 parts of water and the mass is heated on a water-bath for ⅔ hour with continuous stirring. After cooling the solution is filtered, neutralized and evaporated. The treatment with calcium hydroxid can be dispensed with.

*Preparation of the casein product.*

100 parts of casein (calculated free from water and ash) are heated with a solution of 15 parts of caustic soda in 500 parts of water on a water-bath stirring continuously, until only a small amount of flocculent substances remain in the solution. Then 10 parts of calcium hydroxid are added and the agitation and heating are continued for another quarter or half an hour. The mass is allowed to cool. Agitation is continued for about 30 minutes after complete cooling. The mass is filtered. The solution is neutralized and evaporated to dryness.

*Application of products for cleansing textile fibers and woven goods.*

These products prepared from albumin have proved most suitable for the cleansing of wool. For one kilo of wool about 40 to 80 gr. of the products are used according to the cleanliness of the wool.

The product is dissolved in water of 30 to 35° C., and in such quantity that the wool is well and completely soaked and little free liquor remains. The mass is allowed to stand from 15 to 30 minutes. Then about 5 to 6 times of the original quantity of water of 30 to 35° C. are added, the wool is repeatedly squeezed out and again allowed to remain in the solution from 15 to 30 minutes. The liquor is again repeatedly squeezed out and finally rinsed at first with lukewarm water and afterward with cold water. If the wool were very dirty it will be necessary to repeat the operation with a fresh supply of the cleansing product.

After the treatment the wool presents a brilliant glossy appearance; it is elastic and soft, pleasant to the touch and less liable to get dirty than if it had been cleansed by means of soap or in a similar manner. Silk is cleansed in like manner, whereby it presents a fine gloss and a satisfactory touch.

Cotton, linen and other vegetable fibers can be cleansed with the addition of an alkaline carbonate. The process is the same as that employed when soap or soap powder is utilized. The application of the albumin product has the advantage as compared with soap, that the skin is not attacked in any way and the fiber is not only odorless, but it is in no way deteriorated.

The application of the albumin product for toilet-soaps, hair washes and cosmetic preparations presents great advantages not only on account of the pleasant action on the skin but also as regards its cleansing efficiency, which is superior to that of soap and the like.

As above mentioned, these albumin products are not only useful for cleansing textile goods, but they can also be applied with great advantage in the different steps of the manufacture of textile fibers either by themselves, as additions, or in mixture with other materials of a like character. In the latter case they greatly improve the efficiency of other products and tend to save the fibers from deterioration. For that reason they are very useful in the intermediary stages of the manufacture, such as in dressing, finishing, brightening, mordanting, bleaching, degumming, debasting, steeping, clearing all sorts of white, wetting, sprinkling, sizing, spinning, fulling and so forth.

More especially these products have proved useful in dyeing and printing textile goods not only on account of the good effect on the nature of the fiber, but also in connection with the fixation of the colors, which is greatly improved and facilitated.

The addition of these products to dye-baths and thickening mixtures for cloth-printing has the effect that the dyes are fixed more uniformly. The colors are more equal, more vivid, and the tinges are deeper and purer. It is also feasible to alter the composition of the dye-baths and the coloring mixtures according to special needs, which is most desirable in connection with vat-dyeing and the use of sulfur-dyes.

The manner of application in dyeing and cloth-printing is simple, because these products of albumin decomposition are added to the dye-baths and the coloring mixtures without any alternation of the usual requirements. The addition to acid baths, and baths of similar nature must be so regulated that the baths remain clear under all circumstances.

If wool is dyed in the indigo-vat, or with other vat-dyes, the application of the products of the invention is specially advantageous, because it becomes possible not only to dye in a weakly alkaline or a neutral bath, but even in a weakly acid bath and at a more moderate temperature than usual, whereby the deterioration of the fiber is avoided. The so-called sulfur-dyes, which can be employed in the dye-vat, behave in the same manner and great advantages are derived.

The following examples are intended to illustrate quite generally the application of the products of albumin decomposition in dyeing and cloth-printing, and in said examples the proportion 1:1, where used, indicates a mixture or solution of equal parts of water and the element named in connection with the said proportion.

*Dyeing with the addition of the glue product.*

2% dianilbrown 5 G. (Höchst Dye-works).
2% glue product.
5% ammonium formate.
10% crystallized sodium sulfate.

The dyeing is effected as usual. Sometimes it is advisable to steep the fibers, yarns or fabrics to be dyed into a solution of the glue product, to squeeze out the excess of the solution, to dry and to dye afterward in the ordinary bath, or the bath to which some glue product has been added.

*Cloth-printing with the addition of wheat-gluten product.*

10 parts dianilbrown,
10 parts wheat-gluten product,
10 parts ammonium formate,
10 parts crystallized sodium sulfate,
960 parts gum water 1:1, this last ingredient being composed of a solution or mixture of gum and water in equal portions.

The mass is dissolved lukewarm and printed and steamed as usual.

*Dyeing of wool in a weakly acid dye-vat with the addition of casein product.*

40 parts of indigo M L B 60% (Höchst Dyeworks) are distributed in a little warm water and dissolved with sodium hydrosulfite. Then 120 parts of the casein product dissolved in little warm water are added and diluted so that each liter of the dye-bath contains 1 gr. of the casein product. The bath is then neutralized with weak formic acid until it shows a weak acid reaction with litmus paper, whereupon the dyeing is effected at 50-60° C. for 25 to 30 minutes.

*Cloth-printing of wool in a neutral indigo-vat with the addition of casein product.*

15 parts indigo M L B 60%.
70 parts hydrosulfite N. F. 1:1.
615 parts special dextrin-casein product thickening.
300 parts gum water 1:1.

If necessary, the thickening is neutralized, whereupon the cloth is printed and steamed, as usual.

Special casein-product thickening:
200 parts casein-product.
800 parts dextrin (1:1).
Gum-water 1:1:
990 parts gum-water.
10 parts ammonium formate.

The hydrosulfite N. F., mentioned above, is a particular quality or grade of hydrosulfite manufactured by the Höchst Dye Works in Höchst-on-the-Main, and is a molecular mixture of formaldehyde-hydrosulfite with formaldehyde-bisulfite. In the instance in question, it is used in the form of a mixture or solution of equal parts of hydrosulfite and water. The dextrin used in connection with the special casein-product thickening is also in the form of a mixture or solution of equal parts of dextrin and water.

*Dyeing of wool in the sulfur-black vat with the addition of the glue-product.*

2.5 to 7.5 parts of sulfur-black T extra (Agfa) are dissolved in 1 part of caustic soda solution of 40° Bé. with 0.75 to 2.25 parts of hydrosulfite (conc. powder). The solution is diluted with water which has been freed from oxygen by the addition of hydrosulfite. The bath is so regulated that 100 cc. contain 1 gr. of the reduced color. Then 2-6 parts of crystallized ammonium formate, 10-20 parts of crystallized sodium sulfate and 1-3 parts of the glue-product are added. The dyeing is effected at 75° C. for about 30 minutes. The wool is oxidized by hanging in a moist and warm atmosphere. It is finally well rinsed and washed. The hydrosulfite powder above referred to, is an anhydrous sodium hydrosulfite and is very stable in the open air.

The above examples will suffice to present certain illustrative embodiments of the novel process and to point out in a general way how it may be utilized in dyeing and printing operations. It is of course understood that various alterations and modifications may be made in accordance with the nature of the dyes and the fibers and such alterations and modifications are included within the scope of the present invention. The preparation of the dye-baths can be simplified by mixing the dyes with the products of the albumin-decomposition in a suitable manner, so that the coloring preparations can be applied ready made.

Having now particularly described and ascertained the nature of the invention and in what manner the same is to be performed, I declare that what I claim is:

1. The process of cleansing textile fabric which comprises immersing said fabric in a solution consisting of an albumose cleansing compound derived from a simple protein.

2. The process of cleansing textile fabric which comprises dissolving an albumose cleansing compound in water at a temperature of about 30° C. placing said fabric in said solution, adding a further quantity of water, working the fabric in said solution, finally removing the solution from the fabric.

3. The process of cleansing textile fabric which comprises immersing said fabric in a solution consisting of an albumose cleansing compound derived from casein.

4. The process of cleansing textile fabric which comprises dissolving an albumose cleansing compound derived from casein with a quantity of water just sufficient to cover the fabric at a temperature of about 30 to 35° C. placing said fabric in said solution, adding a further quantity of water, working the fabric in said solution, and finally removing the solution from the fabric.

5. The process of cleansing textile fabric which comprises dissolving an albumose cleansing compound in water, placing said fabric in said solution, adding a further quantity of water, working the fabric in said solution, finally removing the solution from the fabric.

6. The process of cleansing textile fabric which comprises immersing said fabric in a solution consisting of an albumose cleansing compound containing salts of acids belonging to the protalbinic acid series.

7. The process of cleansing textile fabric which comprises dissolving an albumose cleansing compound derived from casein with a quantity of water just sufficient to cover the fabric, placing said fabric in said solution, adding a further quantity of water, working the fabric in said solution, and finally removing the solution from the fabric.

In testimony whereof I affix my signature in presence of two witnesses.

CARL BENNERT.

Witnesses:
HENRY HASPER,
ALLEN F. JENNINGS.